R. G. SMITH.
BOBBIN LATHE.
APPLICATION FILED SEPT. 16, 1910.

1,008,747.

Patented Nov. 14, 1911.
2 SHEETS—SHEET 2.

Witnesses
C. C. Richardson

Inventor
Reuben G. Smith,
By Victor J. Evans
Attorney ically simple, efficient and practical device of this character so as to be reliable and efficient in use and capable of application in a lathe which turns bobbins automatically, although the invention is not limited to this type of lathe.
UNITED STATES PATENT OFFICE.

REUBEN G. SMITH, OF NORTH NEWPORT, NEW HAMPSHIRE.

BOBBIN-LATHE.

1,008,747. Specification of Letters Patent. Patented Nov. 14, 1911.

Application filed September 16, 1910. Serial No. 582,388.

*To all whom it may concern:*

Be it known that I, REUBEN G. SMITH, a native citizen of the United States, residing at North Newport, in the county of Sullivan and State of New Hampshire, have invented new and useful Improvements in Bobbin-Lathes, of which the following is a specification.

This invention relates to bobbin lathes and has to do more particularly with means for automatically centering and dogging the blanks from which the bobbins are turned.

The invention has for one of its objects to provide an extremely simple, efficient and practical device of this character so as to be reliable and efficient in use and capable of application in a lathe which turns bobbins automatically, although the invention is not limited to this type of lathe.

Another object of the invention is the provision of oppositely-disposed centering cones which grip the ends of the blank and center the same irrespective of the irregularity in the shape of the blank, in connection with novel means for operating the cones.

A further object is the employment, in connection with the centering cones, of chucks or dogs for gripping the ends of the blank so that the latter can be rotated and turned down by a knife.

With these objects in view and others, as will appear as the description proceeds, the invention comprises the various novel features of construction and arrangement of parts which will be more fully described hereinafter and set forth with particularity in the claims appended hereto.

Figure 1:
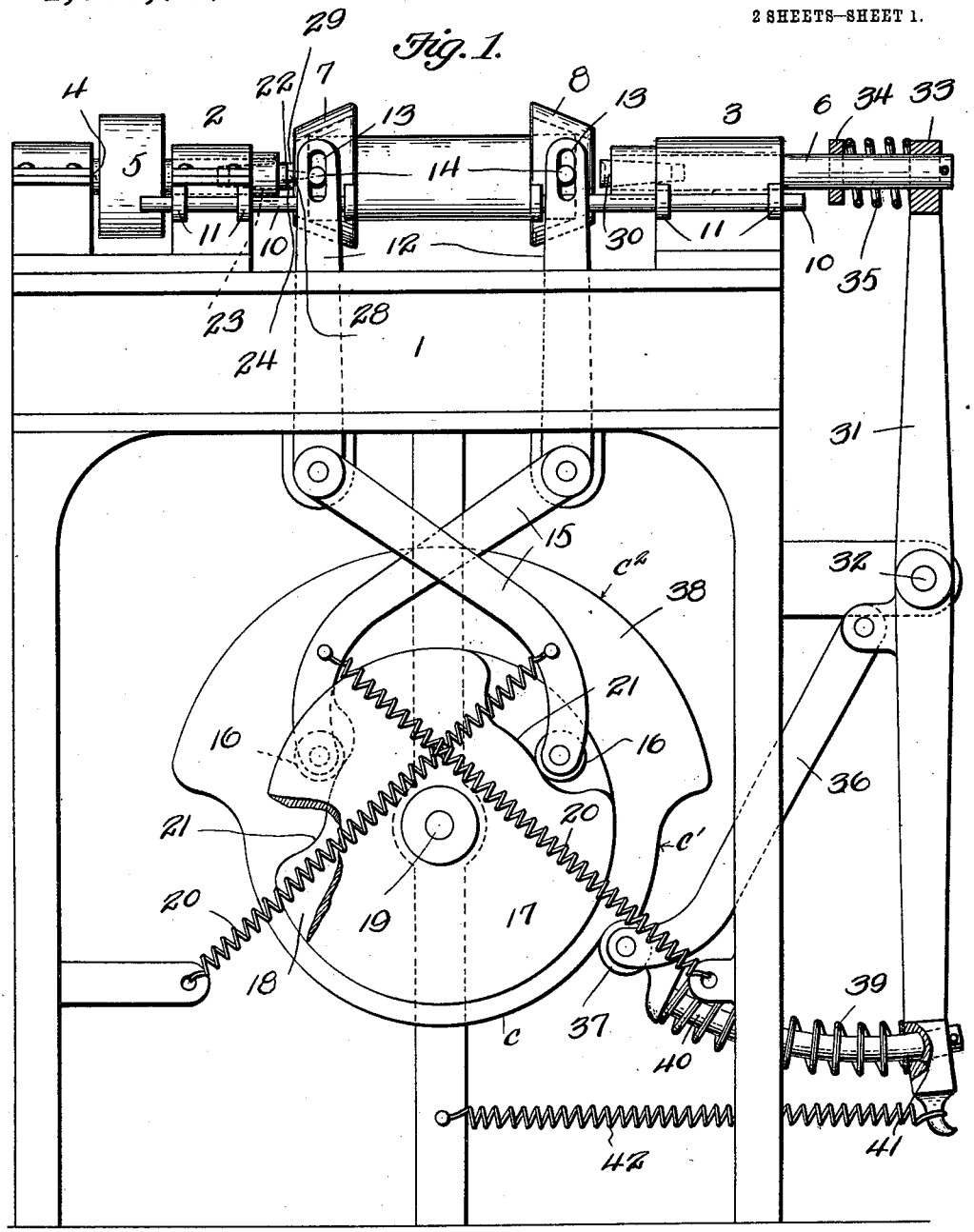
Figure 2:
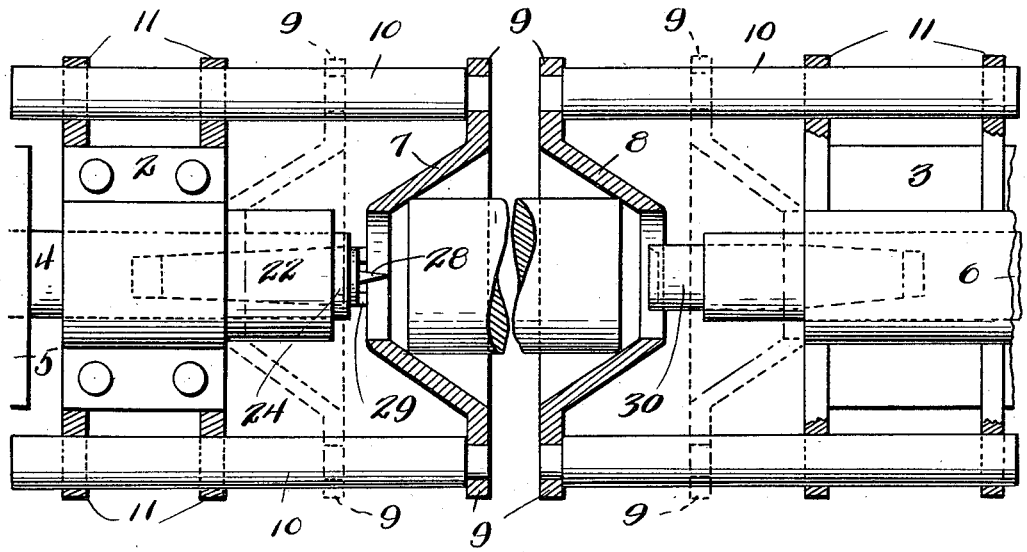
Figure 3:
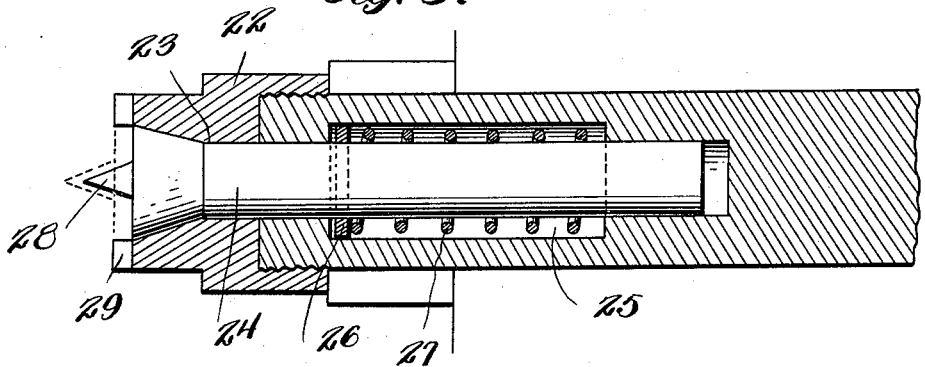

In the accompanying drawings, which illustrate one embodiment of the invention, Figure 1 is a side view of the blank centering and chuck devices of a bobbin lathe. Fig. 2 is a plan view of the centering cones drawn on an enlarged scale and showing the cones, respectively by full and dotted lines in closed and open position. Fig. 3 is a longitudinal section of the spur chuck of the live spindle.

Similar reference characters are employed to designate corresponding parts throughout the views.

In the present instance, I have illustrated only sufficient of the lathe to show the application of the present invention thereto, it being understood that in actual practice means for feeding successive blanks to the centering cones will be provided and operated in timed relation to the latter, and that a knife having a cutting edge corresponding to the finished shape of the bobbins will be employed to turn down the blanks after they are centered and dogged. As the present invention deals only with the blank centering and chuck devices, the blank feeding means and turning knife need not be shown.

Referring to the drawings, 1 designates the bed of a lathe having the usual head and tail stocks 2 and 3 mounted thereon. In the head stock is a live spindle 4 on which is mounted a pulley 5 whereby the spindle can be rotated from a belt. In the tail stock is a longitudinally movable spindle 6 disposed in line with the spindle 4 so that the work can be supported between the spindles and turned.

The blank centering device comprises two oppositely-disposed frusto-conical rings 7 that are disposed with their axes alining and coincident with the axes of the spindles 4 and 6, the larger ends of the cones being presented to each other. These cones are formed with laterally-extending lugs 9 in which are fastened horizontal supporting rods 10 that slide in lugs 11 on the head and tail stocks so that the cones or centering elements can move toward or from each other. The centering elements are actuated by bell crank levers that have arms 12 which pass upwardly through the bed of the lathe and these arms are bifurcated so as to span their respective cones or centering elements, the bifurcated extremities of the levers being provided with slots 13 into which project lugs 14 extending radially from the cones. The arms 15 of the levers cross each other and their lower ends are provided with rollers 16 that ride respectively on the peripheries of cams 17 and 18 secured to a rotating shaft 19 suitably supported on the frame of the lathe and driven in any desired manner. The levers are maintained in contact with the cams by springs 20 that cross each other at a point above the shaft 19, their upper ends being connected with the arms 15 of the levers and their lower ends anchored on the frame of the lathe. These cams 17 and 18 are circular wheels each with a depression 21 in its periphery, and when the rollers 16 are in the depressions, the centering elements or cones will be gripped to the ends of a blank, and when the rollers ride on the circular portions of the cams, the centering elements or cones will be open or released from the blank so that the same can rotate during the turning operation and new blanks can be received and finished bobbins discharged. Since thes centering elements are hollow cones, the blanks from which the bobbins are turned can be irregular in shape so that it is unnecessary to carefully finish the blanks before they are delivered to the lathe, and by thus centering the blanks the lathe will not turn out imperfect bobbins and hence a great saving of wood will be effected.

The live spindle 4 has threaded thereon a spur chuck 22 which, as shown in Fig. 3, is provided with a central opening 23 through which passes a longitudinally-movable center 24, the same extending into a longitudinal chamber 25 in the live spindle. On the shank of the center 24 is a shoulder formed by a collar 26 and bearing against this collar is a helical spring 27 which seats against the inner end of the chamber 25 so as to urge the center or element 24 outwardly. Normally, the point 28 of the yielding center or element 24 projects considerably beyond the teeth 29 of the spur chuck 22 so that this point will engage one end of the blank and support it, while the other end is supported by the chuck or dog 30 in the spindle 6 of the tail stock just prior to the opening of the centering cones and thereby support the blank after the cones have been opened and before the teeth 29 of the chuck 22 have been sunk into the blank. When the chuck 22 has gripped the blank, the element 24 is pressed inwardly so that the spring 27 will be under tension, and when the finished bobbin is about to be dropped out of the lathe, the element 24 will be forced outwardly by the spring 27 for disengaging the teeth 29 of the chuck 22 from the blank.

The spindle 6 that carries the chuck or dog 30 is moved longitudinally by a lever 31 which is fulcrumed at 32 on the frame of the lathe, the upper end of the lever being provided with an opening 33 through which the outer end of the spindle 6 passes. On the spindle 6 is a collar 34 which forms an abutment for a compression spring 35 imposed between the lever 31 and such abutment. Attached to the lever 31 adjacent its fulcrum is a swinging member 36 that has a roller 37 arranged to ride on a cam 38 fastened to the shaft 19, the said cam having three surfaces $c$, $c'$ and $c^2$ of different radii. Interposed between the lower end of the member 36 and lower end of the lever 31 is a spring 39 which is supported by an arcuate bar 40 that is connected with the lower end of the member 36 and that slides through an opening 41 in the lower end of the lever 31. The lower end of the lever is pulled in a direction to maintain the roller 37 against the cam 38 by an extension spring 42 connected with the lower end of the lever and with the frame of the machine. When the roller 37 rides on the lowest part $c$ of the cam 38, the spindle 6 will be in open position or drawn outwardly to its full extent so as not to grip the blank. When the roller 37 passes to the intermediate portion $c'$ of the cam 38, the spindle 6 is moved inwardly far enough to cause the chuck 30 to grip the blank and also to move the blank longitudinally and force it on the point 28 of the live spindle. This movement of the spindle is caused by the member 36 acting through the spring 39 upon the lever 31 and by the said lever acting through the spring 35 upon the spindle 6. During the time that the intermediate elevation $c'$ of the cam is engaged by the roller 37, the blank will be supported at one end solely by the point 28 of the live spindle center and at the other end by the chuck 30 of the tail spindle, and while the blank is thus supported, the rollers 16 ride out of the depressions 21 of the cams 17 and consequently move the centering elements 7 and 8 outwardly so that they will be disengaged from the blank. As soon as the roller 37 passes to the high portion $c^2$ of the cam 38, the spindle 6 is moved inwardly to its full extent so that the blank will be forced against the chuck 22 of the live spindle and the teeth 29 embedded in the blank. Since the chuck 22 rotates continuously, the blank will be rotated as soon as the teeth 29 of the chuck bite into the blank, the blank being free to rotate since the non-rotatable centering devices 7 and 8 are in retracted position where they will not interfere with the turning of the blank. It will thus be seen that the blank, in being positioned in the machine, passes through three different stages. First, it is gripped between the two centering devices 7 and 8. It is next gripped between the point 28 of the live spindle center and chuck 30, while the centering devices 7 and 8 are released or retracted, and finally it is gripped between the teeth of the chuck 22 and the chuck 30 so that the blank can be turned by the live spindle. The cams 17, 18 and 38 are so arranged that the centering of the blank and gripping thereof by the chucks will occur successively. As soon as the blank is engaged by the chuck 22, it will rotate with the live spindle and thereafter the knife is brought into engagement with the blank for turning the latter down into a bobbin. This turning takes place while the roller 39 rides on the high part $c^2$ of the cam 38, and while the rollers ride on the circular parts of the cams 17 and 18. As soon as the bobbin is turned down to proper size, the roller 37 rides off the surface $c^2$ so that the spindle 6 will be forced outwardly by the combined action of the springs 35, 39 and 42. During the outward movement of the spindle 6, the finished bobbin will be forced off the chuck 22 by the element 24 in the live spindle acting as an ejector. As the centering cones are fully open at this time, the finished bobbin will drop into a suitable receptacle placed to receive it and thus make a place for the next blank to be turned. By using the springs 35 and 39, slight variations in the length of the blanks will be provided for.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claims appended hereto.

Having thus described the invention, what I claim as new, is:—

1. In a bobbin lathe of the class described, the combination of head and tail stock spindles, work-engaging devices thereon, having first a supporting and later a driving engagement with the work, non-rotatable and axially movable centering elements mounted independently of the spindles to engage the ends of the work for centering the same between the spindles, and means for moving the elements from the work after the supporting and before the driving engagement between the said devices and the work occurs.

2. In a bobbin lathe of the class described, the combination of head and tail stock spindles, work-engaging devices thereon, non-rotatable and axially movable centering elements mounted independently of the spindles to engage the ends of the work for centering the same between the spindles, means for moving the elements to and from centering position, and means for producing successive relative movements of the spindles to engage and support the work while the centering devices move open and thereafter grip the work with the live spindle for rotation therewith.

3. In a lathe, the combination of head and tail stocks, a spindle mounted in each, having first a supporting and later a driving engagement with the blank, centering devices arranged concentrically to the spindle for gripping the ends of the blank to be turned, a pair of slide rods rigidly secured to each centering device, means on each stock in which the said rods slide and prevent rotation of the centering devices, and means for automatically moving the centering devices toward each other to grip the blank and away from each other between the said engagements of the spindles with the blank to release the latter.

4. In a lathe, the combination of head and tail stocks, spindles mounted therein, centering devices mounted concentrically to the spindles for gripping the ends of the blank to be turned, means for slidably mounting the centering devices on the head and tail stocks independently of the spindles and for holding the devices against rotation, means for automatically moving the elements toward each other to grip the blank and away from each other to release the blank, and means for producing relative movement of the spindles to support the blank while the centering elements release it and to grip and drive the blank after such releasing.

5. In a lathe, the combination of head and tail stocks, spindles mounted therein, centering devices mounted concentrically to the spindles for gripping the ends of the blank to be turned, means for slidably mounting the centering devices on the head and tail stocks independently of the spindles, means for automatically moving the elements toward each other to grip the blank and away from each other to release the blank, and means for automatically moving the spindle in the tail stock toward the blank for effecting a supporting engagement of the spindles therewith while the centering devices are engaged with the blank and later a driving engagement of the spindle with the blank after the centering devices have released the latter.

6. The combination of a head stock spindle, a chuck mounted thereon having work-gripping means and a work-engaging point normally projecting beyond the said means, a tail stock spindle, means for moving the tail stock spindle to grip the work and engage the work on the said point, means for moving the tail stock spindle another step for causing the point to yield and for engaging the work with the gripping means of the said chuck on the live spindle, work-centering devices movable toward and from each other for holding the work preparatory to the same being gripped by the said yielding point and tail stock spindle, and means for disengaging the centering devices from the work after the latter is supported by the said point and tail stock spindle and before the work is engaged by the gripping means of the chuck.

7. In a lathe, the combination of a head stock spindle, a chuck thereon having work-gripping teeth and a yielding point projecting beyond the teeth, a longitudinally movable tail stock spindle, a cam for moving the tail stock spindle longitudinally in two steps to first grip the work and engage the work with the yielding point of the said chuck and in the second step to engage the work with the teeth of the said chuck, means coöperating with the cam for retracting the tail stock spindle to permit the finished work to be discharged, centering devices for the work, means for operating the centering devices before the tail stock spindle begins its two step movement, and means for disengaging the centering devices from the work after the first step and before the finishing of the second step of the tail stock spindle.

8. In a lathe, the combination of a head stock spindle, a chuck thereon having work-gripping teeth and a yielding point projecting beyond the teeth, a longitudinally movable tail stock spindle, a cam for moving the tail stock spindle longitudinally in two steps to first grip the work and engage the work with the yielding point of the said chuck and in the second step to engage the work with the teeth of the said chuck, means coöperating with the cam for retracting the tail stock spindle to permit the finished work to be discharged, centering devices for the work, means for operating the centering devices before the tail stock spindle begins its two step movement, means for disengaging the centering devices from the work after the first step and before the finishing of the second step of the tail stock spindle, said means for moving the centering devices into engagement with the work consisting of cams movable in timed relation to the first-mentioned cam, levers between the centering devices and last-mentioned cams, and springs for holding the levers in coöperative relation with the cams.

9. In a lathe, the combination of a head stock spindle, a chuck thereon having a yielding center point normally projecting beyond the work-gripping portion of the chuck, a longitudinally-movable tail stock spindle, means for moving the tail stock spindle toward the first-mentioned spindle in successive steps, centering devices arranged to engage the ends of the work when in position between the spindles, and means for releasing the centering devices from the work after the tail stock spindle has moved through its first step.

In testimony whereof I affix my signature in presence of two witnesses.

REUBEN G. SMITH.

Witnesses:
WILL E. KEMPTON,
EMMA K. BERG.